US011514252B2

United States Patent
Price et al.

(10) Patent No.: US 11,514,252 B2
(45) Date of Patent: Nov. 29, 2022

(54) DISCRIMINATIVE CAPTION GENERATION

(71) Applicant: Adobe Inc., San Jose, CA (US)

(72) Inventors: Brian Lynn Price, Pleasant Grove, UT (US); Ruotian Luo, Chicago, IL (US); Scott David Cohen, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 1208 days.

(21) Appl. No.: 16/004,395

(22) Filed: Jun. 10, 2018

(65) Prior Publication Data

US 2019/0377987 A1    Dec. 12, 2019

(51) Int. Cl.
| | |
|---|---|
| *G06F 40/56* | (2020.01) |
| *G06K 9/62* | (2022.01) |
| *G06N 3/08* | (2006.01) |
| *G06F 17/16* | (2006.01) |
| *G06N 20/00* | (2019.01) |
| *G06F 16/583* | (2019.01) |
| *G06F 40/40* | (2020.01) |

(52) U.S. Cl.
CPC ............ *G06F 40/56* (2020.01); *G06F 16/583* (2019.01); *G06F 17/16* (2013.01); *G06F 40/40* (2020.01); *G06K 9/6268* (2013.01); *G06N 3/08* (2013.01); *G06N 20/00* (2019.01)

(58) Field of Classification Search
CPC ........ G06F 40/56; G06F 16/583; G06F 40/40; G06F 17/16; G06N 20/00; G06N 3/08; G06K 9/6268
See application file for complete search history.

(56) References Cited

U.S. PATENT DOCUMENTS

| | | | | |
|---|---|---|---|---|
| 2017/0098153 | A1* | 4/2017 | Mao | G06N 3/0454 |
| 2017/0132526 | A1* | 5/2017 | Cohen | G06N 20/00 |
| 2017/0200065 | A1* | 7/2017 | Wang | G06V 10/82 |
| 2017/0200066 | A1* | 7/2017 | Wang | G06K 9/6269 |
| 2018/0373979 | A1* | 12/2018 | Wang | G06N 3/0454 |

OTHER PUBLICATIONS

Luo, Ruotian, et al. "Discriminability objective fortraining descriptive captions." Proceedings of the IEEE Conference on Computer Vision and Pattern Recognition. 2018. (Year: 2018).*

(Continued)

*Primary Examiner* — Fayyaz Alam
(74) *Attorney, Agent, or Firm* — FIG. 1 Patents

(57) ABSTRACT

A discriminative captioning system generates captions for digital images that can be used to tell two digital images apart. The discriminative captioning system includes a machine learning system that is trained by a discriminative captioning training system that includes a retrieval machine learning system. For training, a digital image is input to the caption generation machine learning system, which generates a caption for the digital image. The digital image and the generated caption, as well as a set of additional images, are input to the retrieval machine learning system. The retrieval machine learning system generates a discriminability loss that indicates how well the retrieval machine learning system is able to use the caption to discriminate between the digital image and each image in the set of additional digital images. This discriminability loss is used to train the caption generation machine learning system.

20 Claims, 6 Drawing Sheets

(56) References Cited

OTHER PUBLICATIONS

Anderson,"Bottom-Up and Top-Down Attention for Image Captioning and Visual Question Answering", Aug. 10, 2017, 15 pages.
Anderson,"SPICE: Semantic Propositional Image Caption Evaluation", In European Conference on Computer Vision, 2016, Jul. 29, 2016, 17 pages.
Andreas,"Reasoning about Pragmatics with Neural Listeners and Speakers", Sep. 26, 2016, 10 pages.
Dai,"Contrastive Learning for Image Captioning", Oct. 6, 2017, 10 pages.
Dai,"Towards Diverse and Natural Image Descriptions via a Conditional GAN", Aug. 11, 2017, 10 pages.
Das,"Learning Cooperative Visual Dialog Agents with Deep Reinforcement Learning", Mar. 21, 2017, 11 pages.
Das,"Visual Dialog", Aug. 1, 2017, 23 pages.
De Vries "Guess What?! Visual object discovery through multimodal dialogue", Feb. 6, 2017, 23 pages.
Denkowski,"Meteor Universal: Language Specific Translation Evaluation for Any Target Language", In Proceedings of the ninth workshop on statistical machine translation, Jun. 2014, 5 pages.
Faghri,"VSE++: Improving Visual-Semantic Embeddings with Hard Negatives", Oct. 30, 2017, 11 pages.
Frome,"DeViSE: A Deep Visual-Semantic Embedding Model", In Neural Information Processing Systems, 2013, 11 pages.
Gu,"Stack-Captioning: Coarse-to-Fine Learning for Image Captioning", Sep. 12, 2017, 9 pages.
He,"Deep Residual Learning for Image Recognition", Dec. 10, 2015, 12 pages.
Hendricks,"Generating Visual Explanations", In European Conference on Computer Vision, p. 3{19. Springer, 2016., Mar. 28, 2016, 17 pages.
Jang,"Categorical Reparameterization with Gumbel-Softmax", ICLR 2017, Aug. 5, 2017, 13 pages.
Karpathy,"Deep Visual-Semantic Alignments for Generating Image Descriptions", Department of Computer Science, Stanford University Proceedings of the IEEE Conference on Computer Vision and Pattern Recognition, 2015, 17 pages.
Kazemzadeh,"ReferItGame: Referring to Objects in Photographs of Natural Scenes", Jan. 1, 2014, 12 pages.
Kingma,"Adam: A Method for Stochastic Optimization", Jan. 30, 2017, 15 pages.
Krishna,"Visual Genome Connecting Language and Vision Using Crowdsourced Dense Image Annotations", Feb. 23, 2016, 44 pages.
Li,"Learning to Disambiguate by Asking Discriminative Questions", Aug. 9, 2017, 14 pages.
Lin,"Microsoft COCO: Common Objects in Context", Computer Vision and Pattern Recognition, May 1, 2014, 16 pages.
Lin,"ROUGE: A Package for Automatic Evaluation of Summaries", Jul. 25, 2004, 8 pages.
Ling,"Teaching Machines to Describe Images via Natural Language Feedback", Jun. 5, 2017, 13 pages.
Liu,"Attention Correctness in Neural Image Captioning", Nov. 23, 2016, 7 pages.
Liu,"Improved Image Captioning via Policy Gradient optimization of SPIDEr", Mar. 18, 2017, 12 pages.
Lu,"Best of BothWorlds: Transferring Knowledge from Discriminative Learning to a Generative Visual Dialog Model", Oct. 27, 2017, 11 pages.
Lu,"Knowing When to Look: Adaptive Attention via A Visual Sentinel for Image Captioning", Jun. 6, 2017, 12 pages.
Luo,"Comprehension-guided referring expressions", Jan. 12, 2017, 10 pages.
Ma,"Multimodal Convolutional Neural Networks for Matching Image and Sentence", Aug. 29, 2015, 11 pages.
Maddison,"The concrete distribution: A continuous relaxation of discrete random variables", Mar. 5, 2017, 20 pages.
Mao,"Deep Captioning with Multimodal Recurrent Neural Networks (m-RNN)", Jun. 11, 2015, 17 pages.
Mao,"Generation and Comprehension of Unambiguous Object Descriptions", Apr. 11, 2016, 11 pages.
Nam,"Dual Attention Networks for Multimodal Reasoning and Matching", Mar. 21, 2017, 9 pages.
Papineni,"BLEU: a Method for Automatic Evaluation of Machine Translation", Proceedings of the 40th Annual Meeting of the Association for Computational Linguistics (ACL), Jul. 2002, pp. 311-318.
Peng,"Show, Discriminate, and Tell: A Discriminatory Image Captioning Model with Deep Neural Networks", Retrieved at: http://cs224d.stanford.edu/reports/PengLuo.pdf—on Dec. 29, 2017, 7 pages.
Ranzato,"Sequence Level Training with Recurrent Neural Networks", May 6, 2016, 16 pages.
Ren,"Faster R-CNN: Towards Real-Time Object Detection with Region Proposal Networks", arXiv preprint arXiv: 1506.01497v2, Sep. 13, 2015, 10 pages.
Rennie,"Self-critical Sequence Training for Image Captioning", Nov. 16, 2017, 16 pages.
Schoff,"FaceNet: A Unified Embedding for Face Recognition and Clustering", CVPR 2015, Mar. 12, 2015, pp. 815-823.
Shetty,"Speaking the Same Language: Matching Machine to Human Captions by Adversarial Training", Nov. 6, 2017, 16 pages.
Simonyan,"Very deep convolutional networks for large-scale image recognition", In Journal of Computing Research Repository, Sep. 2014, 14 pages.
Vedantam,"CIDEr: Consensus-based Image Description Evaluation", Jun. 3, 2015, 17 pages.
Vedantam,"Context-aware Captions from Context-agnostic Supervision", Jul. 31, 2017, 15 pages.
Vendrov,"Order-Embeddings of Images and Language", Mar. 1, 2016, 12 pages.
Vinyals,"Show and Tell: A Neural Image Caption Generator", Apr. 20, 2015, 9 pages.
Wang,"Learning Deep Structure-Preserving Image-Text Embeddings", arXiv preprint arXiv: 1511.06078, Nov. 19, 2015, 9 pages.
Wang,"Learning Two-Branch Neural Networks for Image-Text Matching Tasks", Apr. 11, 2017, 14 pages.
Wang,"Skeleton Key: Image Captioning by Skeleton-Attribute Decomposition", Apr. 23, 2017, 10 pages.
Weaver,"The Optimal Reward Baseline for Gradient-Based Reinforcement Learning", Aug. 2, 2001, pp. 538-545.
Weston,"WSABIE: Scaling Up To Large Vocabulary Image Annotation", In Proceedings of the International Joint Conference on Artificial Intelligence, IJCAI, 2011., Jul. 16, 2011, 7 pages.
Williams,"Simple Statistical Gradient-Following Algorithms for Connectionist Reinforcement Learning", May 1, 1992, 27 pages.
Xu,"Show, Attend and Tell: Neural Image Caption Generation with Visual Attention", Apr. 19, 2016, 22 pages.
Yang,"Review Networks for Caption Generation", Oct. 27, 2016, 9 pages.
Yao,"Boosting Image Captioning with Attributes", Nov. 5, 2016, 11 pages.
Yu,"A Joint Speaker-Listener-Reinforcer Model for Referring Expressions", Apr. 17, 2017, 11 pages.
Yu,"Modeling Context in Referring Expressions", Aug. 10, 2016, 19 pages.

* cited by examiner

DISCRIMINATIVE CAPTION GENERATION

BACKGROUND

Digital captioning may be used by a computing device to support a variety of digital image processing. In one example, the computing device generates a caption for the digital image. The caption for a digital image is a description of the digital image, and is typically a text description of the digital image. By having the computing device generate captions, users are saved from the process of generating captions for their digital images.

Conventional techniques to perform digital captioning generate generic descriptions of digital images. For example, conventional techniques may generate a caption of "a large airplane is flying in the sky" for both a digital image of a jetliner taking off from an airport runway at sunset and a digital image of a jetliner flying in the sky. Although these captions are descriptive of the digital images, they fail to provide captions that discriminate or distinguish images from one another. These conventional techniques thus provide captions that are too broad when compared to captions that humans would generate, making the digital captioning ineffective to replace human-generated captions.

SUMMARY

A discriminative caption generation system as implemented by a computing device is described to generate captions for digital images that accurately and concisely describe the digital images, and that allow users to be able to tell two digital images apart given a caption for one of the two digital images. In one example, a first digital image is obtained by the computing device, and a caption for the first digital image is generated using a caption generation machine learning system. The caption, the first digital image, and a set of additional digital images are provided to a retrieval machine learning system. The retrieval machine learning system uses the provided caption and images to generate a discriminability loss. For each image input to the retrieval machine learning system, a feature vector referred to as an image feature vector is generated by extracting features from the image. A feature vector referred to as a caption feature vector is also generated by extracting features from the provided caption. The retrieval machine learning system receives the feature vectors for the images and the caption(s), and uses these feature vectors to generate a discriminability loss for the provided caption. The discriminability loss indicates how well the retrieval machine learning system is able to use the caption to discriminate between the first digital image and each image in the set of additional digital images (how good the provided caption is for the first digital image). The caption generation machine learning system is trained to minimize the discriminability loss, and the trained caption generation machine learning system is used to generate a caption for a second digital image.

In another example, a retrieval machine learning system is trained to generate a discriminability loss that indicates how well the retrieval machine learning system is able to use a caption to discriminate between a digital image for which the caption was generated and each image in a set of additional digital images. For each image input to the retrieval machine learning system, a feature vector referred to as an image feature vector is generated by extracting features from the image. A feature vector referred to as a caption feature vector is also generated by extracting features from a caption. The retrieval machine learning system receives the feature vectors for the images and the caption(s), and uses these feature vectors to generate a discriminability loss for the caption generated for the digital image. A caption generation machine learning system is trained to generate captions for digital images by minimizing the discriminability loss from the retrieval machine learning system, and the caption generation machine learning system is deployed to generate captions for digital images without the retrieval machine learning system.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
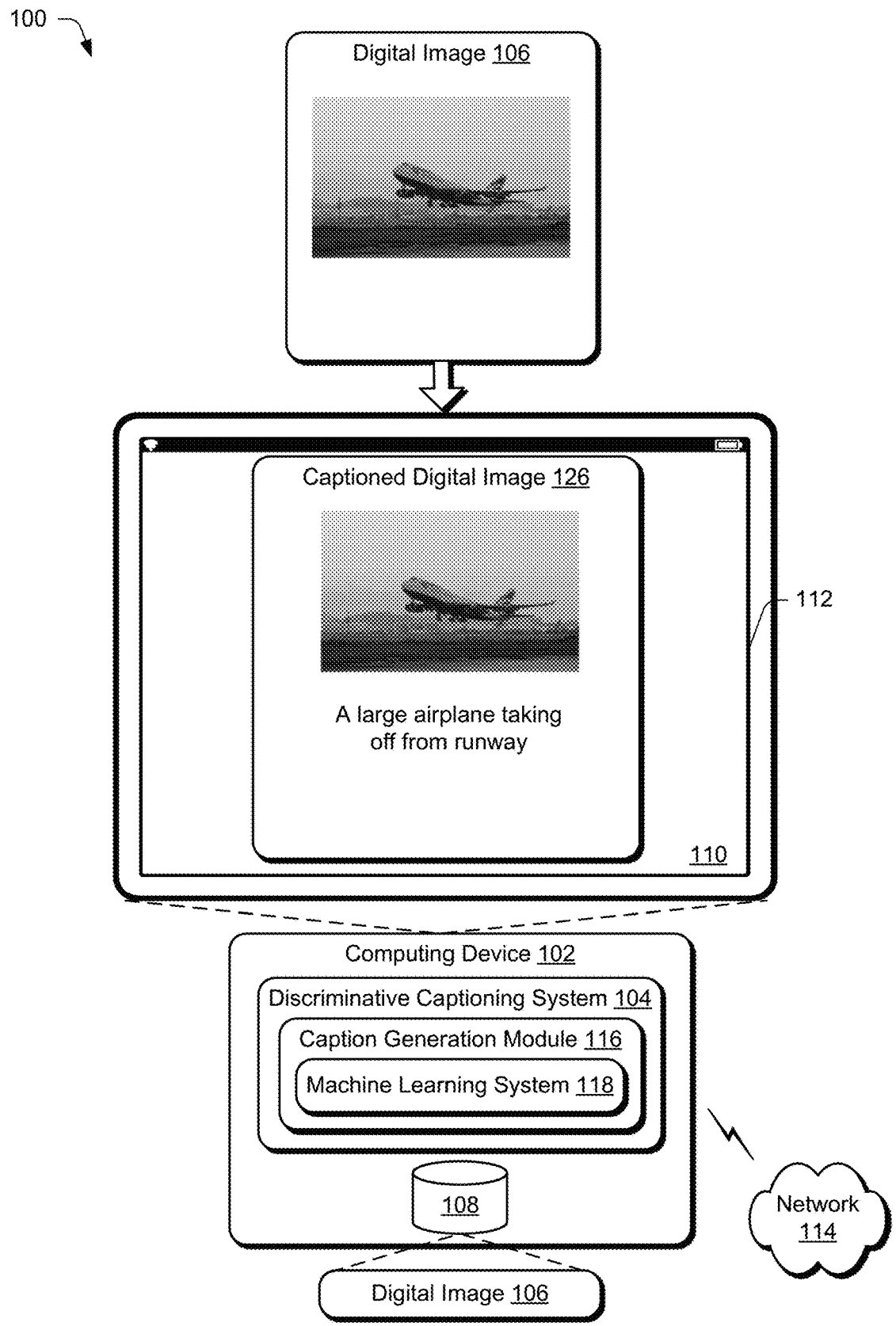
FIG. 1 is an illustration of a digital medium environment in an example implementation that is operable to employ discriminative caption generation techniques described herein.

Discriminative caption generation is discussed herein. Discriminability when referring to captions refers to being able to tell two digital images apart given a caption for one of the two digital images. In accordance with the techniques discussed herein, a discriminative captioning system is generated that includes a caption generation machine learning system, such as a neural network, which is trained based on a discriminability loss that indicates how well the caption can be used to discriminate between images. The caption for a digital image is a description of the digital image and is typically a text description of the digital image. By leveraging the discriminability loss during training, the discriminative captioning system generates captions for digital images that are concise and readily distinguishable from one another by users that can be used to tell two digital images apart, in contrast to generic captions that may be applied to many different digital images.

The techniques discussed herein advantageously utilize a retrieval machine learning system to generate a discriminability loss (which is typically not used for generating captions). A discriminative captioning training system uses this discriminability loss as an input to a neural network to use that neural network as a captioning system. When used in such a way, a captioning system advantageously generates captions that that can be used to tell two digital images apart. Once trained in this manner, the caption generation machine learning system can be deployed as part of a discriminative captioning system to various different devices or systems where the caption generation machine learning system can be used to automatically generate captions for input digital images. More and more common in machine learning systems today, data is fed into a black box and a model is output to be applied to a specific use case. In contrast to traditional machine learning systems, the caption generation machine learning system discussed herein uses a discriminability loss that indicates how well a caption can be used to discriminate between images during training. This use of the discriminability loss allows the caption generation machine learning system to generate captions that better allow two digital images to be told apart given a caption for one of the digital images.

The discriminative captioning training system includes a retrieval machine learning system and a caption likelihood module that are both used to train the caption generation machine learning system. To train the caption generation machine learning system, a digital image is input to the caption generation machine learning system, which generates a caption for the digital image. The digital image and the generated caption, as well as a set of additional images, are input to the retrieval machine learning system. The retrieval machine learning system attempts to identify which image input to the retrieval machine learning system is the digital image for which the caption was generated by using a combined feature space for images and captions. For each image input to the retrieval machine learning system, a feature vector referred to as an image feature vector is generated by extracting features from the image. A feature vector referred to as a caption feature vector is also generated by extracting features from a caption. The retrieval machine learning system receives the feature vectors for the images and the caption(s), and identifies the image feature vector of an image that is closest to the caption feature vector of the generated caption. If the retrieval machine learning system identifies the correct digital image (which is the digital image input to the caption generation machine learning system for which the caption was generated), no changes are made to the caption generation machine learning system. Generally, if the retrieval machine learning system is able to identify the correct digital image, then the caption was discriminative because the retrieval machine learning system was able to use the caption to select the one of multiple digital images for which the caption was generated. However, if the retrieval machine learning system does not identify the correct digital image, then the retrieval machine learning system generates a discriminability loss that is input to the caption generation machine learning system and used to further train the caption generation machine learning system. This discriminability loss that is input to the caption generation machine learning system is a value that judges how good the provided caption is for the first digital image. Generally, if the retrieval machine learning system was not able to identify the correct digital image, then the caption was not discriminative because the retrieval machine learning system was not able to use the caption to select the one of multiple digital images for which the caption was generated.

As part of training the caption generation machine learning system, the digital image input to, and the caption generated by, the caption generation machine learning system are also input to a caption likelihood module. The caption likelihood module evaluates the caption and determines whether the caption is rated as good for the digital image. An indication of whether the caption is good or not is fed back into the caption generation machine learning system and is used to further train the caption generation machine learning system as appropriate. This indication of whether the caption is good or not can take various different forms, such as a likelihood estimate that the caption describes the digital image. The caption likelihood module can be implemented in a variety of different manners. For example, the caption likelihood module can be implemented as a sequence prediction module. By way of another example, the caption likelihood module can be implemented as a machine learning system.

The discriminability loss generated by the retrieval machine learning system is provided to the caption generation machine learning system and used to train the caption generation machine learning system above and beyond what can be done using the caption likelihood module alone, resulting in a caption generation machine learning system that can be used to tell two digital images apart better than systems relying on a caption likelihood module alone. The retrieval machine learning system and caption likelihood module can be used concurrently or at different times. For example, for a given caption generated by the caption generation machine learning system, both feedback from the caption likelihood module and the discriminability loss from the retrieval machine learning system can be used to train the caption generation machine learning system. By way of another example, the caption likelihood module may initially be used to train the caption generation machine learning system, then after some amount of time (e.g., a threshold number of captions being generated, feedback from the caption likelihood module indicating a threshold percentage of the captions have been evaluated as good), and then the retrieval machine learning system can be used to further train the caption generation machine learning system.

By using the retrieval machine learning system to train the caption generation machine learning system, the caption generation machine learning system is able to generate captions for digital images that are readily distinguishable from one another by users. This is in contrast to other training systems in which a caption is generated by a caption generation machine learning system and a generative adversarial network is used to see if the generative adversarial network can tell the difference between the caption generation machine learning system generated captions and human generated captions. Thus, whereas in such other systems a determination is made as to whether a machine learning system can tell the difference between the caption generation machine learning system generated captions and human generated captions, using the techniques discussed herein the retrieval machine learning system determines whether the caption generated by the caption generation machine learning system helps (e.g., users) to distinguish the digital image from other similar digital images.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ discriminative caption generation techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 6.

The computing device 102 is illustrated as including a discriminative captioning system 104. The discriminative captioning system 104 is implemented at least partially in hardware of the computing device 102 to generate a caption for a digital image 106, which is illustrated as maintained in storage 108 of the computing device 102. The storage 108 can be any of a variety of different types of storage, such as random access memory (RAM), Flash memory, solid state drive, magnetic disk drive, and so forth. The discriminative captioning system 104 can also render the digital image, optionally along with the generated caption, in a user interface 110 for output, e.g., by a display device 112. Although illustrated as implemented locally at the computing device 102, functionality of the discriminative captioning system 104 may also be implemented in whole or part via functionality available via the network 114, such as part of a web service or "in the cloud."

An example of functionality incorporated by the discriminative captioning system 104 to generate a caption for the image 106 is illustrated as a caption generation module 116 that includes a machine learning system 118. The caption generation module 116 implements functionality to receive as an input the digital image 106. From this, the machine learning system 118 generates the caption and the caption generation module 116 outputs a captioned digital image 126 automatically and without user intervention. As illustrated, the captioned digital image includes the caption "A large airplane taking off from runway". Other examples are also contemplated, such as to store the caption as associated with the digital image 106 in the storage 108, communicate the caption to another device or system, and so forth.

The machine learning system 118 is also referred to as a caption generation machine learning system, and can be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include, decision trees, support vector machines, linear regression, logistic regression, Bayesian networks, random forest learning, dimensionality reduction algorithms, boosting algorithms, artificial neural networks, deep learning, and so forth.

The caption generation module 116 and associated machine learning system 118 support numerous advantages over conventional techniques used to generate captions for digital images. For example, the machine learning system 118 is trained to generate captions for digital images that are readily distinguishable from one another by users, allowing users to tell the difference between two images given the captions generated by the machine learning system 118. In this way, the discriminative captioning system 104 is able to generate captions that are more informative for users.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Machine Learning System Training

Figure 2:
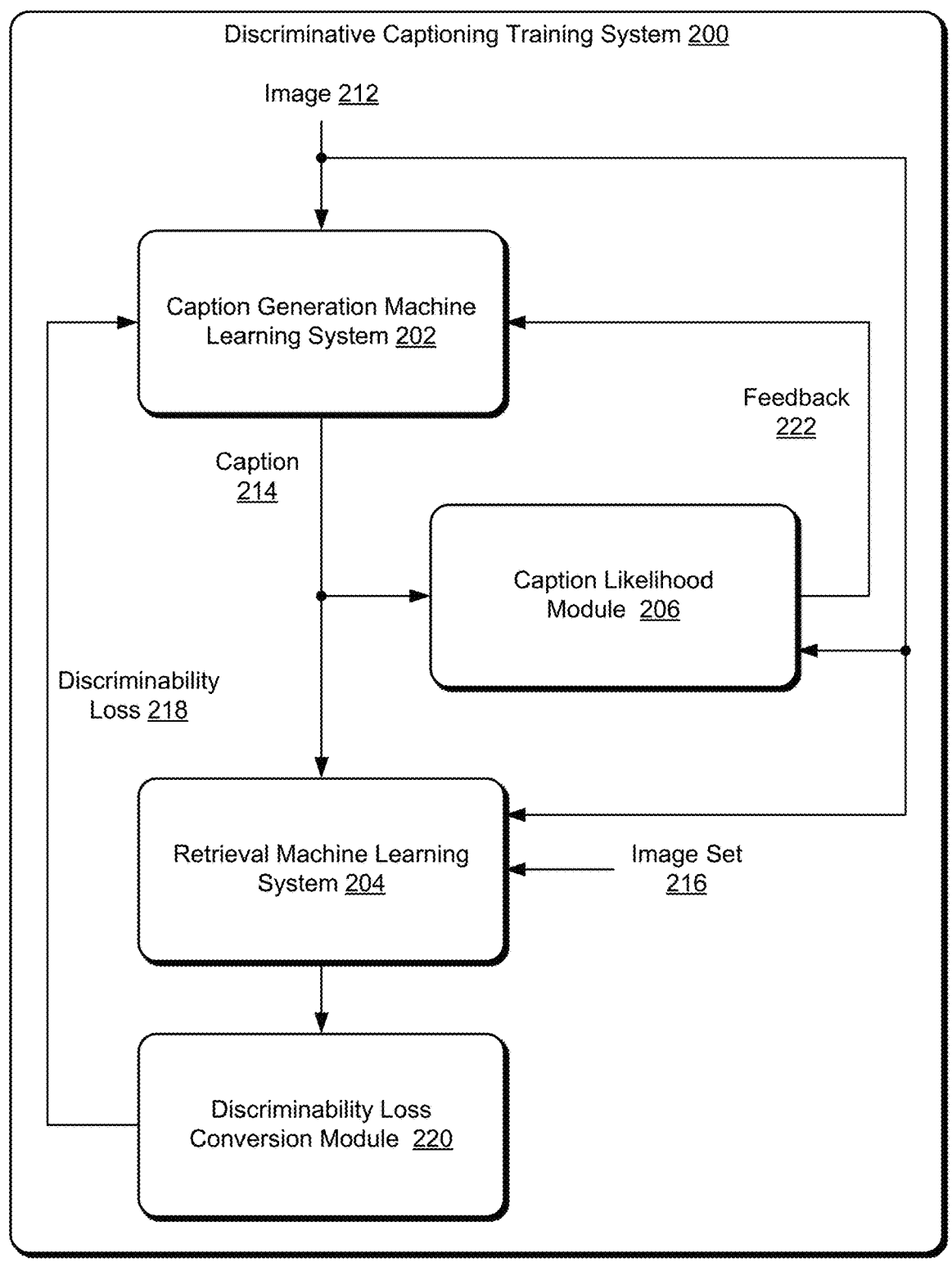
FIG. 2 is an illustration of a discriminative captioning training system in an example implementation that is operable to train a machine learning system.

FIG. 2 is an illustration of a discriminative captioning training system 200 in an example implementation that is operable to train the machine learning system 118 of FIG. 1. In the example of FIG. 2, the machine learning system 118 is illustrated as caption generation machine learning system 202. The discriminative captioning training system 200 also includes a retrieval machine learning system 204 and a caption likelihood module 206. FIG. 2 is discussed with reference to multiple different artificial neural networks, although other machine learning techniques can alternatively be used.

To train the caption generation machine learning system 202, an image 212 is obtained by the caption generation machine learning system 202. The image 212 can be obtained in various manners, such as retrieved from a storage device (e.g., storage 108 of FIG. 1), received from another system or computing device, and so forth. The caption generation machine learning system 202 generates and outputs a caption 214 for the image 212.

The caption 214 and the image 212 are both input to the retrieval machine learning system 204. An additional set of images 216 is also input to the retrieval machine learning system 204. From among the image 212 and the additional set of images 216, the retrieval machine learning system 204 attempts to identify which of those images is the digital image 214 for which the caption was generated. If the retrieval machine learning system 204 identifies the correct digital image (the correct digital image being the image 212 for which the caption 214 was generated), no changes are made to the caption generation machine learning system 202. No change need be made to the caption generation machine learning system 202 because if the retrieval machine learning system 204 is able to identify the correct digital image, then the caption 214 was discriminative because the retrieval machine learning system 204 was able to use the caption 214 to select the image 212 rather than one of the images in the additional set of images 216 as the one of the multiple digital images for which the caption 214 was generated.

However, if the retrieval machine learning system 204 does not identify the correct digital image 212, then the retrieval machine learning system 204 generates a discriminability loss 218 that is a signal input to the caption generation machine learning system 202 and used to further train the caption generation machine learning system 202. The discriminability loss 218 is optionally the discriminability loss generated by the retrieval machine learning system 204 and converted by the discriminability loss conversion module 220 so that the discriminability loss 218 is differentiable, as discussed in more detail below. The discriminability loss 218 is a signal or value that indicates how well the retrieval machine learning system 204 is able to use a caption to discriminate between images (e.g., how well the retrieval machine learning system 204 is able to use the caption 214 to discriminate between the 212 and the images in the image set 216) and can also be referred to as a retrieval loss. Generally, if the retrieval machine learning system 204 was not able to identify the correct digital image, then the caption 214 was not discriminative because the retrieval machine learning system 204 was not able to use the caption 214 to select the image 212 rather than one of the images in the additional set of images 216 as the one of the multiple digital images for which the caption 214 was generated. Thus, the discriminability loss 218, which can be treated as an error signal, is sent to the caption generation machine learning system 202 and then the caption generation machine learning system 202 can use that discriminability loss 218 to adjust internal parameters of the caption generation machine learning system 202 to improve future captions generated by the caption generation machine learning system 202.

Additionally or alternatively, the caption 214 is input to the caption likelihood module 206, which provides feedback 222 that is used to train the caption generation machine learning system 202. For example, the caption likelihood module 206 can be implemented as a sequence prediction module, as a machine learning system, and so forth.

The retrieval machine learning system 204 and the caption likelihood module 206 can be used concurrently or at different times to train the caption generation machine learning system 202. For example, for a given caption 214 generated by the caption generation machine learning system 202, both feedback 222 from the caption likelihood module 206 and the discriminability loss 218 from the retrieval machine learning system 204 can be used to train the caption generation machine learning system 202. Alternatively, the caption likelihood module 206 can be used to generate feedback 222 for a while to train the caption generation machine learning system 202, and then after some amount of time the caption likelihood module 206 can cease being used to generate the feedback 222 and the retrieval machine learning system 204 can begin being used to generate the discriminability loss 218. By way of example, multiple images 212 can be input to the caption generation machine learning system 202 and a caption 214 generated for each such image, and the caption likelihood module 206 can initially be used to generate feedback 222 to train the caption generation machine learning system 202 for those generated images. Then after some amount of time, the caption likelihood module 206 can cease being used and the retrieval machine learning system 204 can be used to generate the discriminability loss 218 for subsequent captions 214 generated by the caption generation machine learning system 202 for subsequent images 212 to further train the caption generation machine learning system 202. This amount of time can be determined in various manners. For example, the amount of time can be after a threshold number of captions 214 (e.g., 1000 captions) have been generated. By way of another example, the amount of time can be after feedback from the caption likelihood module 206 indicates a threshold percentage of the captions 214 (e.g., 75%) have been evaluated as good (e.g., evaluated as having a likelihood estimate that the caption describes the digital image that is greater than a threshold percentage, such as 80%).

The retrieval machine learning system 204 is a network that embeds images and captions into the same feature space. Given an image 212 and several distractor images (image set 216), all these images are embedded into the same feature space, and the image that the caption 214 is closest to in the feature space is the image that the retrieval machine learning system 204 retrieves.

The retrieval machine learning system 204 uses a combined feature space for images and captions. For each image input to the retrieval machine learning system 204 (e.g., image 212 and each additional image in the image set 216), a feature vector referred to as an image feature vector is generated by extracting features from the image. These features extracted from an image can vary, and can be pre-configured in the retrieval machine learning system 204, can be received during operation of the discriminative captioning training system 200, can be determined by the retrieval machine learning system 204 as part of training the retrieval machine learning system 204, combinations thereof, and so forth. A feature vector referred to as a caption feature vector is also generated by extracting features from a caption (e.g., the caption 214). These features extracted from a caption can vary, and can be pre-configured in the retrieval machine learning system 204, can be received during operation of the discriminative captioning training system 200, can be determined by the retrieval machine learning system 204 as part of training the retrieval machine learning system 204, combinations thereof, and so forth. Captions for each image in the image set 216 can also be received and (e.g., human-generated or generated using any of a variety of public and/or proprietary techniques), and caption feature vectors generated for those captions.

The image feature vectors and the caption feature vector(s) are embedded in the same multi-dimensional feature space. If a particular caption defines a particular image then the feature vectors for that particular caption and for that particular image are close to each other in this feature space (e.g., the image feature vector for that particular image is closer to the caption feature vector for the particular caption than the image feature vector for any other image is). Accordingly, the retrieval machine learning system 204 receives the feature vectors for the images and the caption(s), and selects the image feature vector of an image that is closest to the caption feature vector of the caption 214. The image associated with the selected image feature vector (the image from which the selected feature vector was generated) is identified or output by the retrieval machine learning system 204.

The image set 216 can include any number of images. In one example the image set 216 includes between 10 and 30 images, although other numbers of images may be used. The images are selected from a larger collection (e.g., hundreds, thousands, or more) of images. The image set 216 can be obtained in a variety of different manners. In one example, the image set 216 is a set of multiple images chosen randomly or pseudorandomly from the larger collection of images. By way of another example, the image set 216 can be selected as a set of images from the larger collection of images that are similar to image 212. Images similar to the image 212 can be selected in a variety of different manners, such as using any of a variety of public and/or proprietary search techniques, selecting nearest neighbors to the image 212, human-selected, and so forth. The more similar the images in the image set 216 are to the image 212 the better the discriminability loss 218 indication is, and thus the better the caption generation machine learning system 202 is trained.

In another example, the manner in which the image set 216 is selected changes as the retrieval machine learning system 204 is trained. Initially, the image set 216 is a set of multiple images chosen randomly or pseudorandomly from the larger collection of images. After training using randomly or pseudorandomly selected images for a while (e.g., for a threshold number of images 212), the selected images are progressively more similar to the image 212. Progressively more similar images can be selected in different manners, such as using different image search techniques or parameters. E.g., when training the retrieval machine learning system using the digital image 106 of FIG. 1, initially the image set 216 can be pseudorandomly selected images, and then the image set 216 can be images with airplanes, then the image set 216 can be large airplanes, then the image set 216 can be large airplanes taking off, and so forth.

The images in the image set 216 also have corresponding captions. These corresponding captions can have been generated in a variety of different manners. For example, the captions corresponding to the images in the image set 216 can be human-generated captions, can be captions generated using other caption generating systems that can leverage various public and/or proprietary techniques for generating captions, and so forth.

Additionally or alternatively, the images in the image set 216 can be selected based at least in part on the captions of the images in the larger collection of images. By way of another example, the image set 216 can be selected as a set of images from the larger collection of images that are similar to image 212 and that have captions that are similar to caption 214. Images with captions similar to the caption 214 can be selected in a variety of different manners, such as using any of a variety of public and/or proprietary search techniques, human-selected, and so forth.

Figure 3:
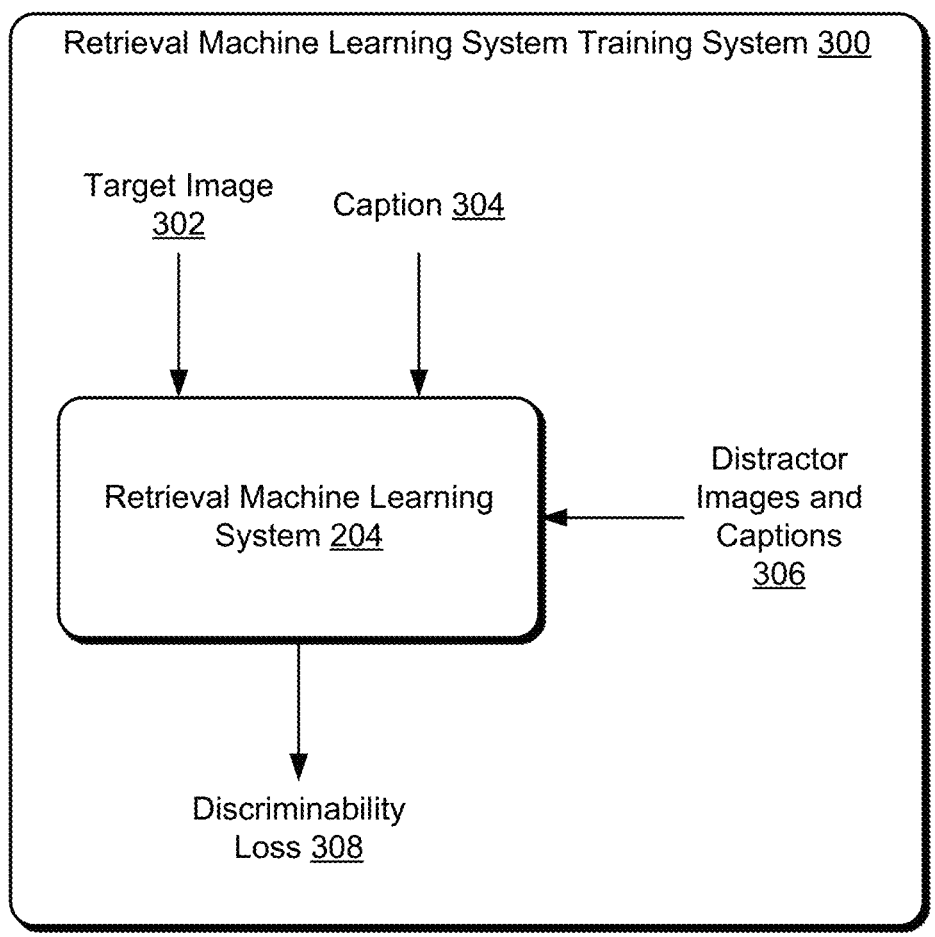
FIG. 3 is an illustration of a retrieval machine learning system training system in an example implementation that is operable to train a retrieval machine learning system.

Prior to training the caption generation machine learning system 202, the retrieval machine learning system 204 is trained. FIG. 3 is an illustration of a retrieval machine learning system training system 300 in an example implementation that is operable to train the retrieval machine learning system 204 of FIG. 1. The retrieval machine learning system training system 300 can be implemented as part of the discriminative captioning training system 200 of FIG. 2, or can be implemented separately form the discriminative captioning training system 200.

Training the retrieval machine learning system 204 involves an image I and a caption c, illustrated as target image 302 and caption 304. A set of distractor images and corresponding captions 306 for the distractor images are also input to the retrieval machine learning system 204. The set of distractor images and captions 306 can be selected from a larger collection of images, analogous to the image set 216 of FIG. 2. For example, the set of distractor images and captions 306 can be selected pseudorandomly, can be selected so that the distractor images and/or captions are similar to the target image 302 and/or caption 304, and so forth. In one example, the retrieval machine learning system 204 is trained so that a discriminability loss 308 generated by the retrieval machine learning system 204 is minimized.

The following illustrates an example of training the retrieval machine learning system 204 using a contrastive loss technique. Domain-specific encoders compute an image feature vector $\phi(i)$, such as by using a convolutional neural network, and a caption feature vector $\psi(c)$, such as by using a recurrent neural network based text encoder. These feature vectors $\phi(i)$ and $\psi(c)$ are then projected into a joint space by $W_I$ and $W_c$ according to the following formulas:

$$f(i) = W_I^T \phi(i) \quad (1)$$

$$g(c) = W_c^T \psi(c) \quad (2)$$

The similarity score between I and c is then computed as the cosine similarity in the embedding space according to the following formula:

$$s(i, c) = \frac{f(I) \cdot g(c)}{\|f(I)\| \|g(c)\|} \quad (3)$$

The parameters of the image and caption embeddings, as well as the maps $W_I$ and $W_c$, are learned jointly, end-to-end, by minimizing the contrastive loss. The contrastive loss is, for example, a sum of two hinge losses according to the following formula:

$$L_{CON}(c, I) = \max_{c'}[\alpha + s(I, c') - s(I, c)]_+ + \max_{I'}[\alpha + s(I', c) - s(I, c)]_+ \quad (4)$$

where $[x]_+ \equiv \max(x, 0)$. The max in formula (4) is taken over a batch of B images and corresponding captions, which are the distractor images and corresponding captions 306. The (image, caption) pairs (I, c) are correct matches, while (I', c) and (I, c') are incorrect matches (e.g., c' is a caption that does not describe I, and c is a caption that does not describe I'). Accordingly, this loss "wants" the retrieval machine learning system 204 to assign the matching pair (I, c) a score higher (by at least $\alpha$) than the score of any mismatching pair (either (I', c) or (I, c')) that can be formed from the batch B. This objective can be viewed as a hard negative mining version triplet loss.

Generally, formula (4) generates a value $L_{CON}(c, I)$ that judges how good a caption c is for an image I. The purpose of the caption generation machine learning system 202 is to produce a good caption for image I, so for a good caption the similarity s(I, c) is really large. Then there are other things relatively speaking to consider. For another caption c' that was not generated for I but is another caption, the similarity of c' to I is less than the similarity of the generated caption c to I if the caption generation machine learning system 202 is doing a good job generating captions. Essentially, this means that the caption generation machine learning system 202 is generating a caption that fits the image I better than some other caption does. Ignoring the a for a moment and concentrating on the s(I, c')−s(I, c), the value s(I, c')−s (I, c) is zero when s(I, c) is bigger than s(I, c'), based on the notation [ ... ]_+. Accordingly, whenever the similarity of the generated caption is bigger to I than some other caption, the value $$\max_{I'}[s(I', c) - s(I, c)]_+$$

is zero, which is good because that is a loss that is to be minimized. The value α is added in so that the value s(I, c) is not only bigger than s(I', c), but the value s(I, c) is bigger than s(I', c) by an additional amount α. This encourages the caption c generated by the caption generation machine learning system 202 for image I to be much better for I than some other captions c'. Further, the similarity of the generated caption c for I should be much better (indicated by the value α) than applying that same caption c to some other image I', as indicated by $$\max_{c'}[\alpha + s(I, c') - s(I, c)]_+.$$

The contrastive loss is discussed above as having a desired caption for a target image be more similar to the target image than other captions corresponding to a set of distractor digital images is to the target image (indicated by the $$\max_{c'}[\alpha + s(I, c') - s(I, c)]_+$$

portion of formula (4) above), and as having the desired caption for the target image be more similar to the target image than to each digital image in the set of distractor digital images (indicated by the $$\max_{I'}[\alpha + s(I', c) - s(I, c)]_+$$

portion of formula (4) above. Additionally or alternatively, the contrastive loss may not rely on having a desired caption for a target image be more similar to the target image than other captions corresponding to a set of distractor digital images is to the target image, in which case the contrastive loss is given by the formula $$L_{CON}(c, I) = \max_{I'}[\alpha + s(I', c) - s(I, c)]_+,$$

or may not rely on having the desired caption for the target image be more similar to the target image than to each digital image in the set of distractor digital images, in which case the contrastive loss is given by the formula $$L_{CON}(c, I) = \max_{c'}[\alpha + s(I, c') - s(I, c)]_+.$$

Additionally or alternatively, techniques other than a contrastive loss technique can be used to train the retrieval machine learning system 204. For example, the retrieval machine learning system 204 can be trained using a pairwise loss technique, which forces the target image generated by the caption generation machine learning system 202 and a ground truth caption (e.g., a caption specified as a desired caption for the image, such as a human-generated caption) to have similarity higher than a distractor image by a margin.

By way of example, the pairwise loss can be determined according to the following formula:

$$L_{PAIR}(I,I',c)=[\alpha+s(I',c)-s(I,c)]_+ \quad (5)$$

In formula (5), I' is a corresponding distractor image of the target image I generated by the caption generation machine learning system 202. The formula (5) forces the target image I and the ground truth caption c to have similarity higher than a distractor image I' and the ground truth caption c by a margin α.

The discriminability loss 218 is the retrieval loss of the caption 214, such as $L_{CON}(\hat{c},I)$ generated in accordance with formula (4) above or $L_{PAIR}(I, I', \hat{c})$ generated in accordance with formula (5) above, where ĉ is the caption 214, optionally converted by the discriminability loss conversion module 220 so that the discriminability loss 218 is differentiable as discussed in more detail below. During training of the retrieval machine learning system 204, the discriminability loss 308 is the retrieval loss of the caption 304, such as $L_{CON}(\hat{c}, I)$ generated in accordance with formula (4) above or $L_{PAIR}(I, I',\hat{c})$ generated in accordance with formula (5) above, where ĉ is the caption 304. During training of the retrieval machine learning system 204, the retrieval loss of the caption 304 is optionally converted (e.g., by a module analogous to the discriminability loss conversion module 220 discussed below) so that the discriminability loss 218 is differentiable.

Returning to FIG. 2, the caption generation machine learning system 202 is trained to minimize the discriminability loss 218. The caption generation machine learning system 202 is parameterized by a set of parameters θ and can output conditional distribution over captions for an image, $p_c(c|I; \theta)$. The objective of minimizing the discriminability loss 218 is defined according to the following formula:

$$\max_{\theta} \mathbb{E}_{\hat{c} \sim p(c|I;\theta)}[L_{CON}(I, \hat{c})] \quad (6)$$

where I is the image for which the caption generation machine learning system 202 is generating a caption ĉ. This objective involves the same constrastive loss that can be used to train the retrieval machine learning system 204. However, when training the retrieval machine learning system 204, the discriminability loss relies on ground truth image-caption pairs (e.g., with human-produced captions), and is back-propagated to update parameters of the retrieval machine learning system. In contrast, when using the discriminability loss to train the caption generation machine learning system 202, an input batch (e.g., over which the max in formula (4) is computed) will include pairs of images with captions that are sampled from the posterior distribution produced by the caption generation machine learning system 202, and the discriminability loss will be used to update parameters θ while holding the retrieval machine learning system 204 fixed.

The retrieval loss of the caption 214, such as the $L_{CON}(\hat{c}, I)$ generated in accordance with formula (4) above or $L_{PAIR}(I, I', \hat{c})$ generated in accordance with formula (5) above, can result in values that are not differentiable. However, generating values that are differentiable is desirable so that the values can be back-propagated through a network for learning (e.g., to train the caption generation machine learning system 202 or the retrieval machine learning system 204). A value being differentiable refers to a derivative being able to be taken from the value. The discriminative captioning training system 200 optionally includes a discriminability loss conversion module 220 that can employ various different techniques can be used to make the discriminability loss 218 differentiable.

One way to make the discriminability loss 218 differentiable is using a Gumbel-Softmax approximation. The Gumbel-Softmax approximation consists of two steps. First, the Gumbel-Max trick is used to reparameterize sampling from a categorical distribution. So, given a random variable w drawn from a categorical distribution parameterized by p, ŵ can be expressed as:

$$\hat{w} = \text{one\_hot}\left[\underset{i}{\text{argmax}}(g_i + \log p_i)\right] \quad (7)$$

where the $g_i$ values are i.i.d. (independent and identically distributed) random variables from the standard Gumbel distribution. Next, the argmax in formula (7) is replaced with softmax to obtain a continuous relaxation of the discrete random variable w' as follows:

$$w' = \text{softmax}\left[\frac{g_i + \log p_i}{\mathcal{T}}\right] \quad (8)$$

where $\mathcal{T}$ is the temperature parameter that controls how close w' is to w, with w'=ŵ when $\mathcal{T}$ =0.

A straight-through variation of the Gumbel-Softmax approximation is used. In the forward path, sample ŵ is used and in the backward path softmax approximation w' is used to allow backpropagation. Additionally, ŵ is the word at each time step.

Another way to make the discriminability loss 218 differentiable is using self-critical sequence training. The objective with self-critical sequence training is to learn parameters θ of the policy (here defining a mapping from I to c, which is p) that would maximize the reward computed by function R(c, I). The algorithm computes an update to approximate the gradient of the expected reward (a function of stochastic policy parameters), known as the policy gradient shown in the following formula:

$$\nabla_\theta E_{\hat{c} \sim p(c|I;\theta)}[R(\hat{c},I)] \approx (R(\hat{c},I)-b)\nabla_\theta \log p(\hat{c}|I;\theta) \quad (9)$$

In formula (9), ĉ represents the generated caption (e.g., caption 214). The baseline b is computed by a function designed to make it independent of the sample (leading to variance reduction without increasing bias). Following the baseline is the value of the reward R(c*) on the greedy decoding output c*=(BOS, $w_1^*, \ldots, w_T^*$), $$w_t^* = \underset{w}{\text{argmax}}\, p(w \mid w_{0,\ldots,t-1}^*, I) \quad (10)$$

The discriminative captioning training system 200 also includes a caption likelihood module 206. The caption likelihood module 206 operates in addition to the retrieval machine learning system 204 to provide feedback to the caption generation machine learning system 202 regarding the generated captions. The caption likelihood module 206 receives the image 212 and the caption 214, and provides feedback 222 to the caption generation machine learning system 202. The caption likelihood module 206 generates a likelihood estimation that the caption 214 describes the image 212.

The caption likelihood module 206 can be implemented in a variety of different manners. For example, the caption likelihood module 206 can be implemented as a cross entropy loss (XE) function:

$$L_{xe}(\theta) = -\Sigma_{t=1}^T \log(p_\theta(w_t^* \mid w_1^*, \ldots, w_{t-1}^*)) \quad (11)$$

where θ denotes the parameters of the caption generation machine learning system 202, and {$w_1, \ldots, w_T$} denotes a target ground truth.

The caption generation machine learning system 202 can be implemented as various different types of machine learning systems. In one example, the caption generation machine learning system 202 is implemented using the FC model, which is a simple sequence encoder initialized with visual features. Words are represented with an embedding matrix (a vector per word), and visual features are extracted from an image using a convolutional neural network.

In the FC model, the caption sequence is generated by a form of LSTM (Long Short-Term Memory) model. The output of the caption sequence at time t depends on the previously generated word and on the context/hidden state (evolving as per LSTM update rules). At training time the word fed to the state t is the ground truth word $w_{t-1}$; at test time, the word fed to the state t is the predicted word $\hat{w}_{t-1}$. The first word is a special BOS (beginning of sentence) token. The sequence production is terminated when the special EOS (end of sentence) token is output. The image features (mapped to the dimensions of word embeddings) serve as the initial "word" $w_{-1}$, fed to the state at t=0.

In another example, the caption generation machine learning system 202 is implemented using the ATTN model. The main difference between the FC model and the ATTN model is that in the ATTN model each image is encoded into a set of spatial features: each encodes a sub-region of the image. At each word t, the context (and thus the output) depends not only on the previous output and the internal state of the LSTM, but also a weighted average of all the spatial features. This weighted averaging of features is called attention mechanism, and the attention weights are computed by a parametric function.

Both the FC and the ATTN models provide a posterior distribution over a sequence of words c=($w_0, \ldots, w_T$), factorized as:

$$p(c \mid I; \theta) = \prod_t p(w_t \mid w_{t-1}, I; \theta) \quad (12)$$

The standard objective in training a sequence prediction model is to maximize word-level log-likelihood, which for a pair (I, c) is defined as $R_{LL}$ (c, I)=log p (c|I; θ). The parameters θ here include word embedding matrix and LSTM weights that are updated as part of training, and the convolutional neural network weights, which are held fixed after pre-training on a vision task such as ImageNet classification. This reward can be directly maximized via gradient ascent (equivalent to gradient descent on the cross-entropy loss), yielding maximum likelihood estimate (MLE) of the model parameters.

The log-likelihood reward is returned as feedback 222 to the caption generation machine learning system 202. The caption generation machine learning system 202 uses the feedback 222 further train itself to generate captions.

In situations in which both the feedback 222 and the discriminability loss 218 are used concurrently to train the caption generation machine learning system 202, in contrast to systems that may train the caption generation machine learning system 202 using only the feedback 222 (e.g., defining the reward as R (c, I)=R $L_L$(c, I)), the discriminative captioning training system 200 incorporates the discriminability loss 218. Combining the log-likelihood reward generated by the caption likelihood module 206 with the discriminability loss generated by the retrieval machine learning system 204 corresponds to defining the reward as:

$$R(c,I)=R_{LL}(c,I)-\lambda L_{CON}(c,I) \quad (13)$$

yielding a policy gradient as follows:

$$\nabla_\theta E[R(c,I)] \approx \nabla_\theta R_{LL}(\hat{c},I) - \lambda [L_{CON}(\hat{c},I) - L_{CON}(c^*,I)] \nabla_\theta \log p(\hat{c}|I;\theta) \quad (14)$$

The coefficient λ determines the tradeoff between matching human captions (expressed by the cross-entropy) and discriminative properties expressed by $L_{CON}$.

The caption generation machine learning system 202 is trained to maximize the reward R(c, I), thus training the caption generation machine learning system 202 to generate discriminative captions that allow users to be able to tell two digital images apart given a caption for one of the two digital images.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-3.

Figure 4:
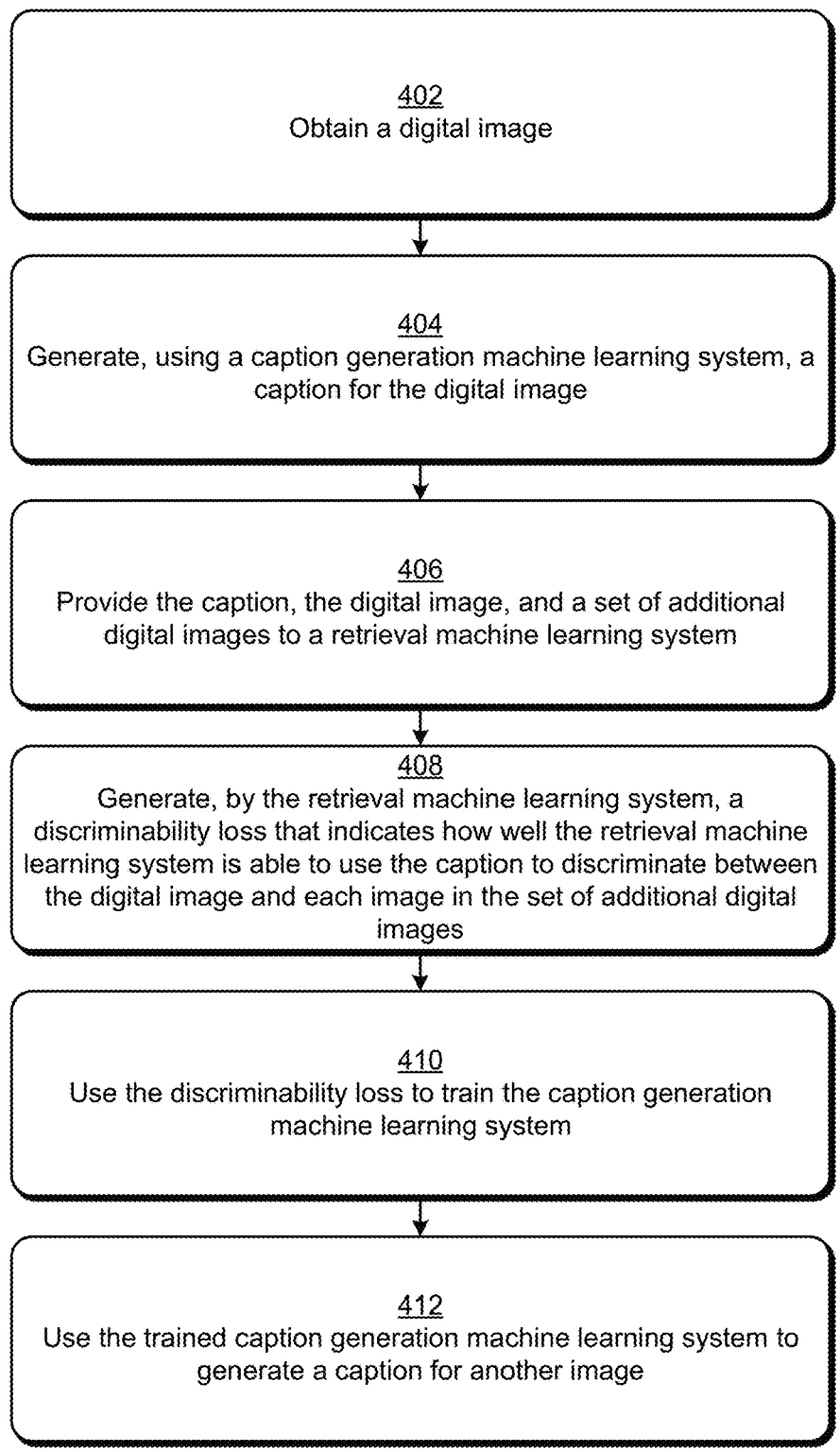
FIG. 4 is a flow diagram depicting a procedure in an example implementation of discriminative caption generation.

FIG. 4 is a flow diagram depicting a procedure in an example implementation of discriminative caption generation. In this example, the discriminative captioning training system 200 trains the caption generation machine learning system 202 to generate captions for digital images. The caption generation machine learning system 202 obtains a digital image (block 402). The caption generation machine learning system 202 can be obtained in various different manners, such as retrieved from storage 108, received from a device other than the device implementing the discriminative captioning training system 200, received as a user input to the device implementing the discriminative captioning training system 200, and so forth.

The caption generation machine learning system generates a caption for the digital image (404). The generated caption is a description of the digital image obtained in block 402, and is typically a text description of the digital image. The caption generation machine learning system generates a captions for the digital image that is readily distinguishable from captions of other digital images, in contrast to generic captions that may be applied to many different digital images The caption generated in block 404, the image obtained in block 402, and a set of additional digital images are provided to a retrieval machine learning system (block 406). The set of additional digital images are also referred to as distractor images. The retrieval machine learning system generates a discriminability loss that indicates how well the retrieval machine learning system is able to use the caption generated in block 404 to discriminate between the digital image obtained in block 402 and each image in the set of additional digital images (block 408). The retrieval machine learning system can generate the discriminability loss in a variety of different manners, such as by using a contrastive loss technique and/or a pairwise loss technique discussed above.

The discriminability loss is provided to the caption generation machine learning system and used to train the caption generation machine learning system (block 410). Training the caption generation machine learning system using the discriminability loss allows the caption generation machine learning system to better generate captions for digital images that are readily distinguishable from captions of other digital images, in contrast to generic captions that may be applied to many different digital images, and that can rival or be indistinguishable from human-generated captions. The trained caption generation machine learning system is then used to generate a caption for another image (block 412).

Figure 5:
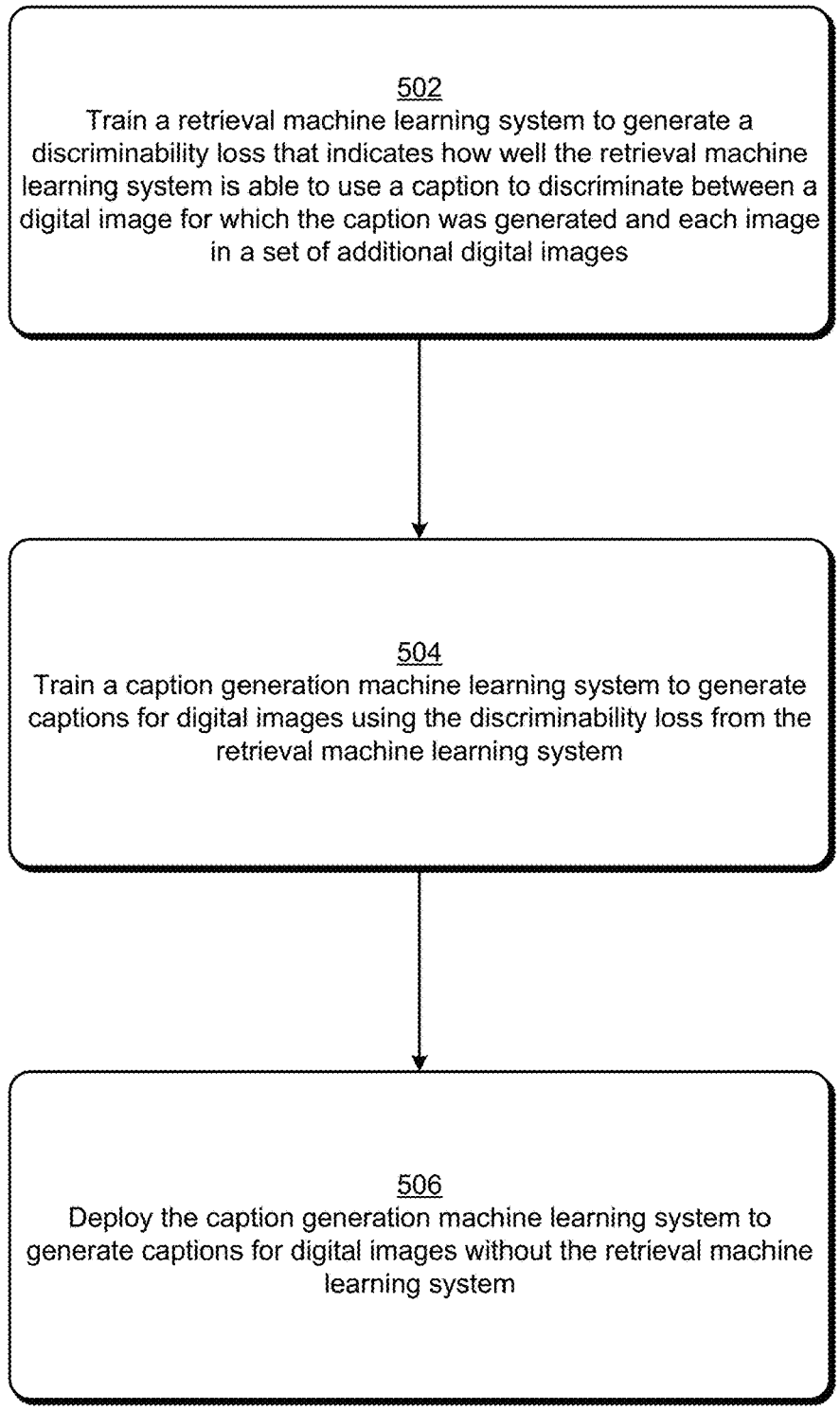
FIG. 5 is a flow diagram depicting a procedure in another example implementation of discriminative caption generation.

FIG. 5 is a flow diagram depicting a procedure in another example implementation of discriminative caption generation. In this example, the discriminative captioning training system 200 generates a caption generation machine learning system 202 for deployment to various different systems or devices.

The retrieval machine learning system training system 300 trains a retrieval machine learning system 204 to generate a discriminability loss (block 502). The discriminability loss indicates how well the retrieval machine learning system 204 is able to use a caption to discriminate between a digital image for which the caption was generated and each image in a set of additional digital images.

The discriminative captioning training system 200 trains a caption generation machine learning system 202 to generate captions for digital images using the discriminability loss from the retrieval machine learning system 204 (block 504). Separately or concurrently with using the discriminability loss, the discriminative captioning training system 200 can also train the caption generation machine learning system using feedback from a caption likelihood module indicating how good the caption is for the digital image.

The caption generation machine learning system 202 is deployed to generate captions for digital images without the retrieval machine learning system 204 (block 506). Once the caption generation machine learning system 202 is trained, the retrieval machine learning system 204 is no longer needed and thus the caption generation machine learning system is allowed to be deployed without the retrieval machine learning system 204. The caption generation machine learning system 202 can be deployed in different manners, such as embedded in application or services, sent or otherwise communicated to other devices or systems for use, and so forth.

Example System and Device

Figure 6:
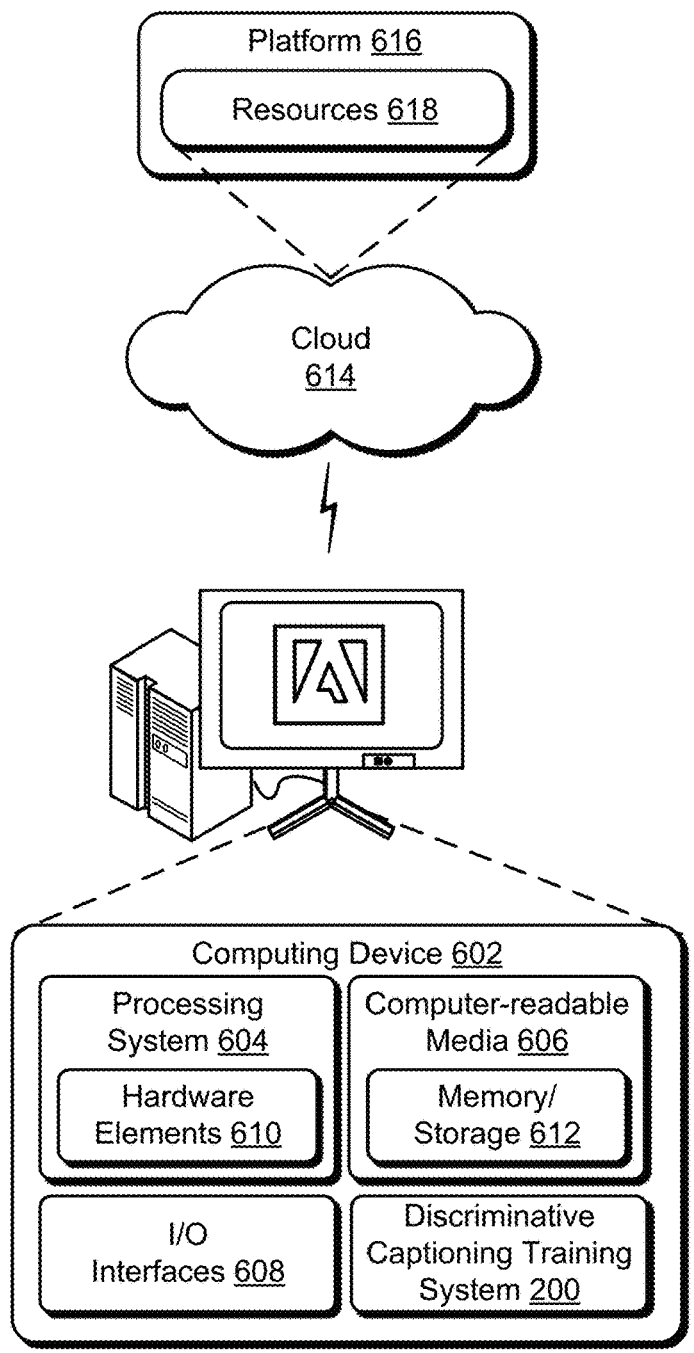
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the discriminative captioning training system 200. Although not illustrated in FIG. 6, the computing device 602 can additionally or alternatively include a discriminative captioning system 104. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   obtaining, by one or more processing devices, a first digital image;
   generating, by the one or more processing devices using a caption generation machine learning system, a caption for the first digital image;
   providing, by the one or more processing devices, the caption, the first digital image, and a set of additional digital images to a retrieval machine learning system trained using a pairwise loss technique that forces a target image and a desired caption for the target image to have similarity higher than a distractor image by a margin;
   generating, by the one or more processing devices using the retrieval machine learning system and based on the caption, the first digital image, and the set of additional digital images, a discriminability loss that indicates how well the retrieval machine learning system is able to use the caption to discriminate between the first digital image and each image in the set of additional digital images;
   using, by the one or more processing devices, the discriminability loss to train the caption generation machine learning system; and
   using, by the one or more processing devices the trained caption generation machine learning system to generate an additional caption for a second digital image.

2. The method as described in claim 1, further comprising training the retrieval machine learning system using a contrastive loss technique that has the desired caption for the target image be more similar to the target image than to each digital image in a set of distractor digital images.

3. The method as described in claim 2, wherein the contrastive loss technique further has the desired caption for the target image be more similar to the target image than other captions corresponding to the set of distractor digital images are to the target image.

4. The method as described in claim 1, wherein using the discriminability loss to train the caption generation machine learning system minimizes the discriminability loss.

5. The method as described in claim 1, wherein the discriminability loss is differentiable.

6. The method as described in claim 1, further comprising:
   providing the caption and the first digital image to a caption likelihood module;
   generating, by the caption likelihood module, feedback that indicates a likelihood estimation that the caption describes the first digital image; and
   using the feedback to train the caption generation machine learning system.

7. A method comprising:
   training, by a processing device, a retrieval machine learning system using a pairwise loss technique that forces a target image and a desired caption for the target image to have similarity higher than a distractor image by a margin to generate a discriminability loss that indicates how well the retrieval machine learning system is able to use a caption to discriminate between a digital image for which the caption was generated and each image in a set of additional digital images;
   training, by the processing device, a caption generation machine learning system to generate captions for digital images using the discriminability loss from the retrieval machine learning system; and
   deploying, by the processing device, the caption generation machine learning system to generate captions for digital images without the retrieval machine learning system.

8. The method as described in claim 7, wherein training the retrieval machine learning system includes using a contrastive loss technique that has the desired caption for the target image be more similar to the target image than other captions corresponding to a set of distractor digital images is to the target image, and that has the desired caption for the target image be more similar to the target image than to each digital image in the set of distractor digital images.

9. The method as described in claim 7, wherein training the caption generation machine learning system includes training the caption generation machine learning system to minimize the discriminability loss.

10. The method as described in claim 7, wherein the discriminability loss is differentiable.

11. The method as described in claim 7, further comprising using a caption likelihood module to generate feedback that indicates a likelihood estimation that the caption describes the digital image, and training the caption generation machine learning system further includes training the caption generation machine learning system to generate captions for the digital images using the feedback from the caption likelihood module.

12. A system comprising:
   a caption generation machine learning system implemented by one or more processing devices to generate a caption for a first digital image;
   a retrieval machine learning system implemented by the one or more processing devices to generate, based on the caption, the first digital image, and a set of additional digital images, a discriminability loss that indicates how well the retrieval machine learning system is able to use the caption to discriminate between the first digital image and each image in the set of additional digital images, the retrieval machine learning system trained using a pairwise loss technique that forces a target image and a desired caption for the target image to have similarity higher than a distractor image by a margin; and
   the caption generation machine learning system further to use the discriminability loss to train the caption generation machine learning system.

13. The system as described in claim 12, wherein the retrieval machine learning system is trained using a contrastive loss technique that has the desired caption for the target image be more similar to the target image than other captions corresponding to a set of distractor digital images is to the target image.

14. The system as described in claim 13, wherein the contrastive loss technique further has the desired caption for the target image be more similar to the target image than to each digital image in the set of distractor digital images.

15. The system as described in claim 12, wherein the caption generation machine learning system being further to minimize the discriminability loss.

16. The system as described in claim 12, further comprising a discriminability loss conversion module implemented to convert the discriminability loss generated by the retrieval machine learning system to a differentiable discriminability loss.

17. The system as described in claim 12, further comprising a caption likelihood module implemented to generate feedback that indicates a likelihood estimation that the caption describes the first digital image, and the caption generation machine learning system to use the feedback from the caption likelihood module to train the caption generation machine learning system.

18. The method as described in claim 1, wherein the retrieval machine learning system uses a combined feature space for images and captions.

19. The method as described in claim 7, further comprising generating an additional caption for an additional digital image using the caption generation machine learning system.

20. The system as described in claim 12, wherein the retrieval machine learning system uses a combined feature space for images and captions.

* * * * *